(12) United States Patent
Matsumura et al.

(10) Patent No.: US 11,431,454 B2
(45) Date of Patent: Aug. 30, 2022

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 27 days.

(21) Appl. No.: 17/047,889

(22) PCT Filed: Apr. 18, 2019

(86) PCT No.: PCT/JP2019/016700
§ 371 (c)(1),
(2) Date: Oct. 15, 2020

(87) PCT Pub. No.: WO2019/203325
PCT Pub. Date: Oct. 24, 2019

(65) Prior Publication Data
US 2021/0168800 A1   Jun. 3, 2021

(30) Foreign Application Priority Data
Apr. 18, 2018   (JP) .............................. JP2018-090965

(51) Int. Cl.
*H04L 5/00* (2006.01)
*H04W 72/04* (2009.01)
*H04B 1/713* (2011.01)

(52) U.S. Cl.
CPC .......... *H04L 5/0048* (2013.01); *H04L 5/0042* (2013.01); *H04W 72/042* (2013.01); *H04W 72/0446* (2013.01); *H04B 1/713* (2013.01); *H04L 5/0053* (2013.01); *H04W 72/0453* (2013.01)

(58) Field of Classification Search
CPC .. H04L 5/0042; H04L 5/0048; H04W 72/042; H04W 72/0446
See application file for complete search history.

(56) References Cited

U.S. PATENT DOCUMENTS

| | | | |
|---|---|---|---|
| 2019/0052422 A1* | 2/2019 | Yin | ........................ H04L 5/0092 |
| 2019/0200326 A1* | 6/2019 | Shin | ......................... H04L 5/005 |
| 2019/0288816 A1* | 9/2019 | Ren | ..................... H04W 72/042 |

OTHER PUBLICATIONS

International Search Report issued in PCT/JP2019/016700 dated Jun. 25, 2019 (2 pages).
Written Opinion of the International Searching Authority issued in PCT/JP2019/016700 dated Jun. 25, 2019 (4 pages).
(Continued)

*Primary Examiner* — Kevin C. Harper
(74) *Attorney, Agent, or Firm* — Osha Bergman Watanabe & Burton LLP

(57) ABSTRACT

A terminal is disclosed including a processor that determines a position of a demodulation reference signal for an uplink shared channel based on whether or not intra-slot frequency hopping of the uplink shared channel is enabled and based on a configuration value set by higher layer signaling; and a transmitter that transmits the uplink shared channel and the demodulation reference signal. In other aspects, a radio communication method and a base station are also disclosed.

13 Claims, 10 Drawing Sheets

(56) References Cited

OTHER PUBLICATIONS

NTT Docomo, Inc.; "Remaining details on DM-RS"; 3GPP TSG RAN WG1 Meeting #92bis, R1-1805045; Sanya, China; Apr. 16-20, 2018 (11 pages).
3GPP TS 38.214 V15.1.0; "3rd Generation Partnership Project; Technical Specification Group Radio Access Network; NR; Physical layer procedures for data (Release 15)" Mar. 2018 (11 pages).
Huawei, HiSilicon; "Summary of remaining details on UL/DL DMRS design in NR"; 3GPP TSG RAN WG1 Ad Hoc Meeting, R1-1800091; Vancouver, Canada; Jan. 22-26, 2018 (12 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in Application No. 19788862.1 dated Dec. 14, 2021 (9 pages).
Samsung, "Corrections on Reference Signals and QCL" 3GPP TSG RAN WG1 Meeting #94, R1-1808751, Gothenburg, Sweden, Aug. 20-24, 2018, (11 pages).

* cited by examiner

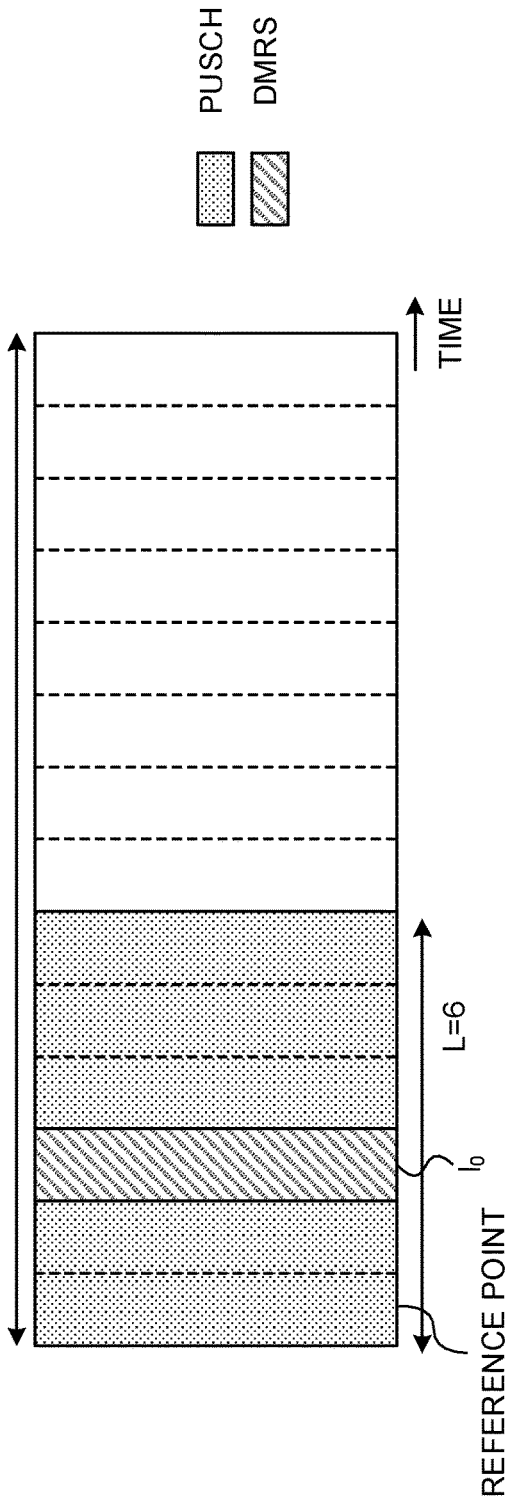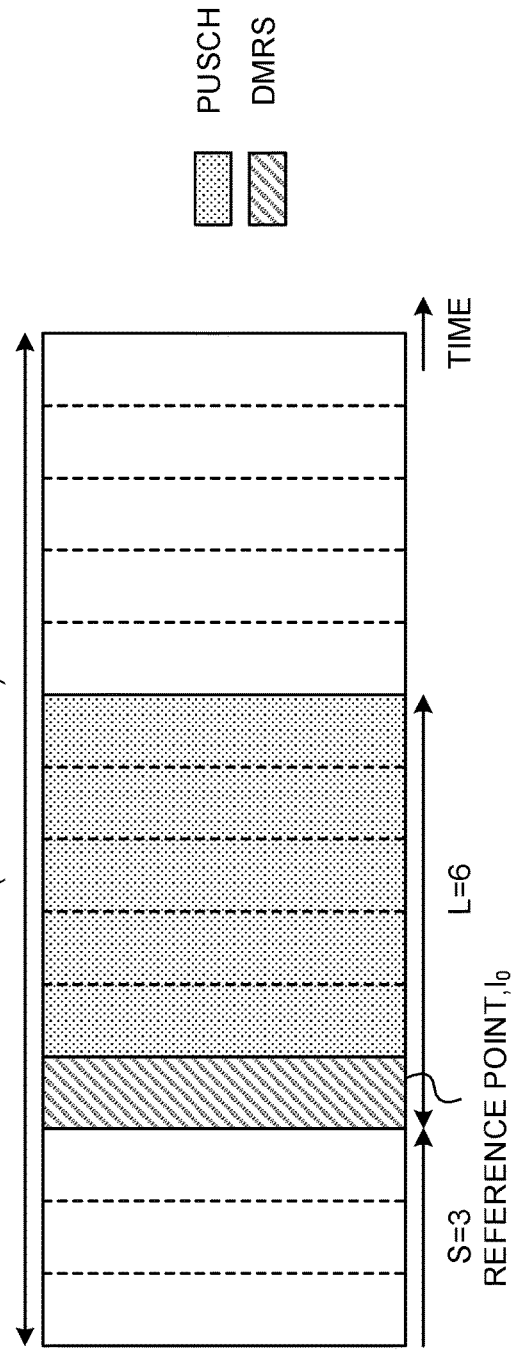

FIG. 2A

| Duration in symbols | DM-RS positions $\bar{l}$ | | | | | | | |
|---|---|---|---|---|---|---|---|---|
| | PUSCH mapping type A | | | | PUSCH mapping type B | | | |
| | UL-DMRS-add-pos | | | | UL-DMRS-add-pos | | | |
| | 0 | 1 | 2 | 3 | 0 | 1 | 2 | 3 |
| <4 | - | - | - | - | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, [4] | $l_0$, [4] | $l_0$, [4] |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, [7] | $l_0$, [7] | $l_0$, [7] | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

FIG. 2B

| Duration in symbols | DM-RS positions $\bar{l}$ | | | | | | | |
|---|---|---|---|---|---|---|---|---|
| | PUSCH mapping type A | | | | PUSCH mapping type B | | | |
| | UL-DMRS-add-pos | | | | UL-DMRS-add-pos | | | |
| | 0 | | 1 | | 0 | | 1 | |
| | First hop | Second hop | First hop | Second hop | First hop | Second hop | First hop | Second hop |
| ≤3 | - | - | - | - | $l_0$ | 0 | - | - |
| 4 | $l_0$ | 0 | - | - | $l_0$ | 0 | - | - |
| 5, 6 | $l_0$ | 0 | - | - | $l_0$ | 0 | $l_0$, $l_0$+4 | 0, 4 |
| 7 | $l_0$ | 0 | $l_0$, $l_0$+4 | 0, 4 | $l_0$ | 0 | $l_0$, $l_0$+4 | 0, 4 |

| Duration in symbols for each hop | DM-RS positions $\bar{l}$ | | | | | | | |
|---|---|---|---|---|---|---|---|---|
| | PUSCH mapping type-A | | | | PUSCH mapping type-B | | | |
| | UL-DMRS-add-pos | | | | UL-DMRS-add-pos | | | |
| | 0 | | 1 | | 0 | | 1 | |
| | Fist hop | Second hop | Fist hop | Second hop | Fist hop | Second hop | Fist hop | Second hop |
| ≤3 | - | - | - | - | $l_0$ | 0 | $l_0$ | 0 |
| 4 | $l_0$ | 0 | $l_0$ | 0 | $l_0$ | 0 | $l_0$ | 0 |
| 5, 6 | $l_0$ | 0 | $l_0$ | 0, 4 | $l_0$ | 0 | $l_0, l_0+4$ | 0, 4 |
| 7 | $l_0$ | 0 | $l_0, l_0+4$ | 0, 4 | $l_0$ | 0 | $l_0, l_0+4$ | 0, 4 |

FIG. 3

| Duration in symbols for each hop | DM-RS positions $\bar{l}$ |||||||||||||||||
|---|---|---|---|---|---|---|---|---|---|---|---|---|---|---|---|---|
| | PUSCH mapping type-A ||||||||| PUSCH mapping type-B ||||||||
| | UL-DMRS-add-pos ||||||||| UL-DMRS-add-pos ||||||||
| | 0 || 1 || 2 || 3 || 0 || 1 || 2 || 3 ||
| | 1st hop | 2nd hop | 1st hop | 2nd hop | 1st hop | 2nd hop | 1st hop | 2nd hop | 1st hop | 2nd hop | 1st hop | 2nd hop | 1st hop | 2nd hop | 1st hop | 2nd hop |
| ≤3 | - | - | - | - | - | - | - | - | $l_0$ | 0 | $l_0$ | 0 | $l_0$ | 0 | $l_0$ | 0 |
| 4 | $l_0$ | 0 | $l_0$ | 0 | $l_0$ | 0 | $l_0$ | 0 | $l_0$ | 0 | $l_0$ | 0 | $l_0$ | 0 | $l_0$ | 0 |
| 5, 6 | $l_0$ | 0 | $l_0$, $l_0+4$ | 0, 4 | $l_0$, $l_0+4$ | 0, 4 | $l_0$, $l_0+4$ | 0, 4 | $l_0$ | 0 | $l_0$, $l_0+4$ | 0, 4 | $l_0$, $l_0+4$ | 0, 4 | $l_0$, $l_0+4$ | 0, 4 |
| 7 | $l_0$ | 0 | | | | | | | $l_0$ | 0 | $l_0$, $l_0+4$ | 0, 4 | $l_0$, $l_0+4$ | 0, 4 | $l_0$, $l_0+4$ | 0, 4 |

FIG. 4

TERMINAL, RADIO COMMUNICATION METHOD, AND BASE STATION

TECHNICAL FIELD

The present invention relates to a user terminal and a radio communication method in next-generation mobile communication systems.

BACKGROUND ART

Specifications of Long-Term Evolution (LTE) have been drafted for the purpose of achieving a further increased data rate, a further reduced latency, and so on in UMTS (Universal Mobile Telecommunications System) networks, (see Non-Patent Literature 1). Specifications of LTE-A (LTE Advanced, LTE Rel. 10, Rel. 11, Rel. 12, Rel. 13) have been drafted in order to further increase the capacity and advancement of LTE (LTE Rel. 8, Rel. 9).

Successor systems to LTE (also referred to as, for example, FRA (Future Radio Access), 5G (5th generation mobile communication system), 5G+(plus), NR (New Radio), NX (New radio access), FX (Future generation radio access), or LTE Rel. 14 or Rel. 15 (or later versions)) are also under study.

In existing LTE systems (for example, LTE Rel. 8 to Rel. 13), downlink (DL) and/or uplink (UL) communications are carried out using 1-ms subframes (referred to as, for example, "transmission time intervals (TTIs)"). The subframe is the unit of time to transmit one data packet that is channel-encoded, and is the processing unit in scheduling, link adaptation, retransmission control (HARQ (Hybrid Automatic Repeat reQuest), and so on.

A radio base station (for example, eNB (eNode B) controls allocation (scheduling) of data to a user terminal (UE: User Equipment), and uses downlink control information (DCI) to report a data scheduling command to the UE. For example, in a case of receiving DCI for a command for UL transmission (also referred to as UL grant), a UE compliant with existing LTE (for example, LTE Rel. 8 to Rel. 13) transmits UL data in a subframe a given period after the reception (for example, 4 ms after the reception).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), support of frequency hopping of a UL channel (for example, UL shared channel (PUSCH (Physical Uplink Shared Channel) and/or a UL control channel (PUCCH (Physical Uplink Control Channel), also referred to as an uplink signal or the like) is under study to allow a frequency diversity gain to be obtained.

For NR, flexible control of allocation of data (for example, the PUSCH or the like) is under study. For example, control of allocation of data in units of one or more symbols (also referred to as, for example, mini-slots) included in a slot is also under study.

However, in a case where at least one of frequency hopping and allocation in units of symbols is enabled for UL channels, a problem is how to control demodulation reference signals (DMRSs) for the UL channels. In a case where the DMRSs are not appropriately mapped, the UL channels may fail to be appropriately demodulated, leading to degraded communication quality.

It is thus an object of the present disclosure to provide a user terminal and a radio communication method capable of appropriately mapping a DMRS for a UL channel.

Solution to Problem

A user terminal according to an aspect of the present disclosure includes a control section that controls a position of a reference signal utilized to demodulate an uplink shared channel, based on whether intra-slot frequency hopping of the uplink shared channel is enabled or disabled and on a configuration value configured by higher layer signaling, and a transmitting section that transmits the uplink shared channel and the reference signal.

Advantageous Effects of Invention

According to the present invention, a DMRS for a UL channel can be appropriately mapped.

BRIEF DESCRIPTION OF DRAWINGS

FIGS. 1A and 1B are diagrams to show a mapping type of a PUSCH;

FIGS. 2A and 2B are diagrams to show an example of a table in which the numbers and positions of DMRSs and additional DMRSs are defined;

FIG. 3 is a diagram to show another example of a table in which the numbers and positions of DMRSs and additional DMRSs are defined;

FIG. 4 is a diagram to show another example of a table in which the numbers and positions of DMRSs and additional DMRSs are defined;

DESCRIPTION OF EMBODIMENTS

Figure 5:
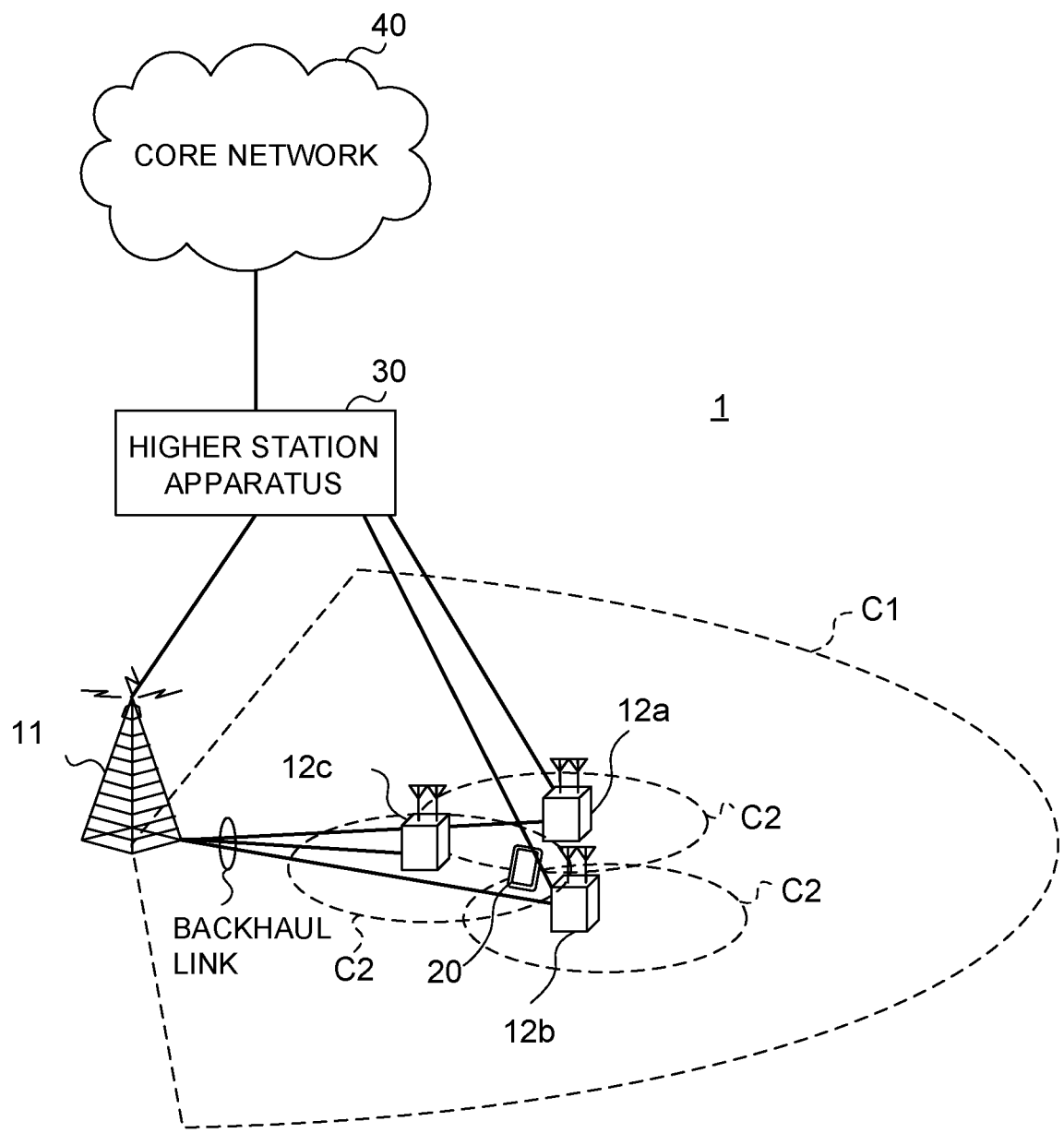
FIG. 5 is a diagram to show an example of a schematic structure of a radio communication system according to one embodiment of the present invention.

For future radio communication systems (for example, LTE Rel. 14, Rel. 15 or later versions, 5G, and NR. The future radio communication system is hereinafter also referred to as NR), transmission of data and so on utilizing slot-based scheduling and mini-slot-based scheduling is under study.

A slot is one of basic transmission units, and one slot is constituted of a given number of symbols. For example, in a normal CP, a slot period is constituted of a first number of symbols (for example, 14 symbols), and in extended CP, a slot period is constituted of a second number of symbols (for example, 12 symbols).

A mini-slot corresponds to a period constituted of symbols the number of which is equal to or smaller than a given value (for example, 14 symbols (or 12 symbols)). As an example, in DL transmission (for example, PDSCH transmission), the mini-slot may be constituted of a given number of symbols (for example, 2, 4, or 7 symbols).

For allocation of data (for example, PUSCHs), different resource allocation types (for example, a type A and a type B) may be applied.

For example, a case is assumed where, in a UL (for example, PUSCH transmission), the type A (hereinafter also referred to as the PUSCH mapping type A) is applied. In this case, a start position of the PUSCHs in a slot is selected from pre-configured fixed symbols (for example, symbol index #0), and the number of PUSCH allocation symbols (for example, a PUSCH length) is selected from a range from a given (a given) value (Y) to 14 (see FIG. 1A).

FIG. 1A illustrates a case in which the PUSCHs are allocated in the first to sixth symbols (symbols #0 to #5) of a slot. In this way, in the PUSCH mapping type A, the start position of the PUSCHs is fixed, but the PUSCH length (in this case, L=6) is flexibly configured. Note that Y may be a value larger than 1 (Y>1) or may be equal to or larger than 1. Y may be 4, for example.

In the type A, a demodulation reference signal (DM-RS) utilized to demodulate the PUSCHs is mapped to one or more symbols (also referred to as DMRS symbols). The first DMRS symbol ($l_0$) may be indicated by a higher layer parameter (for example, UL-DMRS-typeA-pos). For example, the higher layer parameter may indicate whether $l_0$ is 2 or 3 (whether the first DMRS symbol is symbol index 2 or 3.

In the type A, in addition to the first DMRS symbol ($l_0$), DMRSs may be mapped to one or more additional symbols. At least one of the number and position of the additional DMRS symbols may be reported to a UE from a base station through higher layer signaling. For example, the UE determines at least one of the number and position of the additional DMRSs, based on information related to a PUSCH mapping period (for example, the number of symbols) and the number of additional DMRSs reported by a higher layer parameter (for example, UL-DMRS-add-pos). UL-DMRS-add-pos may be interpreted as DM-RS-add-pos or dmrs-AdditionalPosition.

In the type A, the position 1 of each DMRS symbol in a time direction may be defined using the start symbol (symbol #0) of a slot as a reference (reference point).

Now, a case is assumed where, in the UL (for example, PUSCH transmission), the type B (hereinafter also referred to as the PUSCH mapping type B) is applied. In this case, the number of PUSCH mapping symbols (for example, the PUSCH length) is selected from the pre-configured candidate numbers of symbols (1 to 14 symbols), and the start position of the PUSCHs in a slot is configured as any position (symbol) in the slot (see FIG. 1B).

In FIG. 1B, the start symbol of the PUSCHs is a given symbol (in this case, symbol #3 (S=3) and that four (L=6) symbols are contiguously mapped starting with the start symbol. Thus, in the PUSCH mapping type B, the start symbol (S) of the PUSCHs and the number (L) of contiguous symbols starting with the start symbol are reported to the UE from the base station. The number (L) of contiguous symbols starting with the start symbol is also referred to as a PUSCH length. In this way, in the PUSCH mapping type B, the start position of the PUSCHs is flexibly configured.

In the type B, the DMRS utilized to demodulate the PUSCHs is mapped to one or more symbols (also referred to as DMRS symbols). The first DMRS symbol ($l_0$) for the DMRSs may be a fixed symbol. For example, the first DMRS symbol may be equal to the start symbol of the PUSCHs (it may be assumed that $l_0=0$).

In the type B, in addition to the first symbol ($l_0$), DMRSs may be mapped to one or more additional symbols. At least one of the number and position of the additional DMRS symbols may be reported to the UE from the base station through higher layer signaling. For example, the UE determines at least one of the number and position of the additional DMRSs, based on information related to a PUSCH mapping period (for example, the number of symbols) and the number of additional DMRSs reported by a higher layer parameter (for example, UL-DMRS-add-pos).

In the type B, the position 1 of each DMRS symbol in the time direction may be defined using the start symbol (in FIG. 1B, symbol #3) of scheduled PUSCH resources as a reference (reference point).

The information (S) indicating the start symbol of the data (for example, the PUSCHs) and the information (L) indicating the length of the data (or information related to a combination set of S and L) may be reported to the user terminal from the base station. In this case, the radio base station may pre-configure a plurality of candidates (entries) for a combination of the start symbol (S) and the data length (L), to the user terminal, by the higher layer signaling, and report, to the user terminal, information specifying a specific candidate in downlink control information. Note that, in the type B, a plurality of combinations (for example, 105 combinations) of the PUSCH length and the start position are assumed.

Which of the mapping types is used for the PUSCHs may be configured by the higher layer signaling (for example, higher layer signaling) or reported in DCI or recognized through a combination of the higher layer signaling and the DCI.

As described above, the UE may determine the configuration of the additional DMRSs (for example, at least one of the number of the additional DMRSs and the position of each additional DMRS), based on the information reported by the higher layer signaling. Specifically, the number and positions of the additional DMRSs may be determined, based on the information reported by the higher layer signaling (for example, DMRS-add-pos), the PUSCH mapping period (for example, the number of symbols), and the mapping type, with reference to a pre-defined table (see FIGS. 2A and 2B).

FIG. 2A corresponds to a table defining the positions of the DMRSs for PUSCH demodulation in a case where frequency hopping (hereinafter also referred to as FH) is not enabled, and FIG. 2B corresponds to a table defining the positions of the DMRSs for PUSCH demodulation in a case where FH is enabled. The positions of the DMRSs are defined, based on the period of the PUSCHs (the number of symbols), the mapping type, and the information reported by the higher layer signaling (for example, DMRS-add-pos). DMRS-add-pos may be the maximum number of additional DMRSs. Note that, in FIGS. 2A and 2B, the symbol positions of the DMRSs are not limited to this. For example, in FIG. 2A, at least one of [4]s corresponding to the additional DMRS symbols for which the PUSCH mapping period for the mapping type B is 5, and [7]s corresponding to additional DMRS symbols for which the PUSCH mapping period for the mapping type A is 8 may be changed to a different value.

Thus, at present, the following is under study: the DMRS-add-pos, the period of the PUSCHs, and the configuration of the additional DMRSs are defined depending on whether the FH is enabled/disabled as shown in FIGS. 2A and 2B. In FIGS. 2A and 2B, when the FH is applied, the period of the PUSCHs during each hop is equal to or shorter than seven symbols, and thus the maximum number of the additional DMRSs is defined as 1 or less.

Whether the FH for the UL transmission (for example, the PUSCH transmission) is enabled/disabled may be reported to or configured for the UE from the base station by utilizing downlink control information (for example, the DCI). In this case, whether the FH is enabled/disabled (or whether or not the FH is configured) is dynamically controlled by utilizing the DCI. However, the value (for example, DMRS-add-pos) associated with the number of the DMRSs is controlled in a semi-static manner by utilizing the higher layer signaling.

In consideration of such a case, a case where the FH is not enabled, and the like, a DMRS-add-pos of larger than a given value (for example, DMRS-add-pos>1) may be configured for the UE by the higher layer signaling, and enabling of the FH may be configured by using the DCI. In such a case, a problem is how to control the mapping of the DMRSs (for example, configuration of the additional DMRSs) in a case where the FH is enabled By focusing on a difference in, for example, timing between configuration of the DMRS-add-pos (for example, the higher layer signaling) and configuration of whether the FH is enabled/disabled (for example, the DCI), the inventors of the present invention have contrived application of a predetermined DMRS allocation configuration in consideration of whether the FH is enabled/disabled and the configuration value of the DMRS-add-pos.

Hereinafter, embodiments of the present invention will be described in detail with reference to the drawings. Aspects may be applied independently or may be combined together for application. Note that the description below focuses on the application of the frequency hopping to the PUSCHs but that the description is also appropriately applicable to application of the frequency hopping to PUCCHs.

Intra-slot frequency hopping in which the frequency hopping is enabled within one slot will be described below as an example. However, the description below is also appropriately applicable to inter-slot frequency hopping in which the frequency hopping is enabled among a plurality of slots. The description below may be applied to at least one of PUSCH transmission before RRC connection, PUSCH transmission at the time of RRC reconnection (or RRC reconfiguration), and PUSCH transmission after RRC connection.

The PUSCH transmitted before RRC is, for example, a random access procedure (for example, message 3). Note that the PUSCH transmitted before RRC connection as used herein may be interpreted as a PUSCH not scheduled by a PDCCH to which a CRC (Cyclic Redundancy Check) is applied that is scrambled with a C-RNTI (Cell-Radio Network Temporary Identifier) or a CS-RNTI (Configured Scheduling RNTI).

(First Aspect)

In a first aspect, in a case where a configuration value configured by the higher layer signaling (for example, the DMRS-add-pos) is equal to or larger than a given value (a given value) or is larger than the given value, control is provided to make the mapping of the DMRSs (for example, at least one of the mapping position of each of the additional DMRSs and the number of the additional DMRSs) common in the PUSCH transmission for which the FH is enabled.

It is assumed that, for the UE, the enabling of the FH for the PUSCH transmission is configured and the given value of the DMRS-add-pos is configured by the higher layer signaling. The enabling of the FH may be reported to the UE from the base station by configuring, to a given value (for example, 1), a PUSCH hopping flag included in a DCI format.

In a case where the enabling of the FH is configured, the UE determines the mapping of the DMRSs in the PUSCH transmission (for example, at least one of the number of the additional DMRSs and the position of each of the additional DMRSs) based on a predetermined table. FIG. 3 shows an example of the table to be referred to in a case where the enabling of the FH is configured.

In FIG. 3, the positions of the DMRSs are defined, based on the period of the PUSCHs (the number of symbols), the mapping type, and the DMRS-add-pos reported by the higher layer signaling. For the DMRS-add-pos, 0 and 1 are defined. Note that, in a case where disabling of the FH for the PUSCHs is configured, the UE may refer to a different table (for example, see FIG. 2A) to control the allocation of the DMRSs. The disabling of the FH may be reported to the UE from the base station by configuring, to the given value (for example, 0), the PUSCH hopping flag included in the DCI format.

For example, it is assumed that the enabling of the FH is configured and that a DMRS-add-pos value larger than 1 (for example, DMRS-add-pos=2, 3, or the like) is configured by the higher layer signaling. In this case, the UE assumes, in the table in FIG. 3, that the DMRS-add-pos value is a specific value (for example, DMRS-add-pos=1) to control the allocation of the DMRSs. In other words, in a case where a DMRS-add-pos value of 1 or more (1 or a value larger than 1) is configured by the higher layer signaling and where the enabling of the FH is configured, the UE applies a DMRS configuration (or referred to as a DMRS pattern) corresponding to DMRS-add-pos value=1.

Alternatively, in a case where the enabling of the FH is configured and where the DMRS-add-pos that is a higher layer parameter, is larger than 1, the UE may assume that the maximum value of the additional DMRSs (or DMRS-add-pos) is equal to 1 to control the mapping of the DMRSs.

Thus, in a case where a DMRS-add-pos value equal to or larger than a given value (for example, 1) is configured, a common DMRS configuration is applied to allow the mapping of the DMRSs to be appropriately controlled even in a case where the FH is configured in a case where the DMRS-add-pos value is larger than the given value. The mapping of the DMRSs in the case where the FH is enabled can be appropriately controlled with reference to a table in which the DMRS-add-pos is not configured to be larger than the given value.

Note that, in a case of $l_0=3$, only a given value (for example, DMRS-add-pos=0) may be supported as the DMRS-add-pos value in FIG. 3. This allows the DMRS mapping to be appropriately configured, based on the start position of the PUSCHs.

(Second Aspect)

In a second aspect, a DMRS allocation configuration is defined that is common in the PUSCH transmission in which the FH is enabled in a case where the configuration value configured by the higher layer signaling (for example, the DMRS-add-pos) is equal to or larger than a given value.

In a case where the enabling of the FH is configured, the UE determines the mapping of the DMRSs in the PUSCH transmission (for example, at least one of the number of the additional DMRSs and the position of each of the additional DMRSs), based on a predetermined table. FIG. 4 shows an example of the table to be referred to in a case where the enabling of the FH is configured.

In FIG. 4, the positions of the DMRSs are defined, based on the period of the PUSCHs (the number of symbols), the mapping type, and the DMRS-add-pos reported by the higher layer signaling. Here, as the DMRS-add-pos, 2 and 3 are defined in addition to 0 and 1. Note that, in a case where disabling of the FH for the PUSCHs is configured, the UE may refer to a different table (for example, see FIG. 2A) to control the allocation of the DMRSs. The disabling of the FH may be reported to the UE from the base station by configuring, to the given value (for example, 0), the PUSCH hopping flag included in the DCI format.

The table in FIG. 4 corresponds to the table in FIG. 3 in which, as the DMRS-add-pos, 2 and 3 are additionally defined as well as 0 and 1. As a DMRS configuration corresponding to a DMRS-add-pos of larger than a given value (for example, 1), a DMRS configuration may be applied in which the DMRS-add-pos is equal to the given value. In FIG. 4, in a case where the DMRS-add-pos is equal to or larger than 1, a DMRS configuration (or DMRS pattern) common to each PUSCH period is defined.

Of course, the second aspect is not limited to the table shown in FIG. 4, and the contents of the table may be such that a DMRS configuration is defined that is common to at least some of the PUSCH periods. DMRS-add-pos=2, 3 may be added to only one of the mapping type A and the mapping type B.

In a case where the enabling of the FH is configured and where a DMRS-add-pos value equal to or larger than 1 (for example, DMRS-add-pos≥1) is configured by the higher layer signaling, the UE applies the common DMRS configuration to control the mapping of the DMRSs.

In this way, in the second aspect, the DMRS configuration corresponding to the configurable DMRS-add-pos value is defined for a table for FH disabling (see, for example, FIG. 2A) and for a table for FH enabling (see, for example, FIG. 4). This allows the mapping of the DMRSs to be appropriately controlled in accordance with the DMRS-add-pos value and with whether the FH is enabled/disabled.

(Third Aspect)

In a third aspect, control is performed so as to make the DMRS-add-pos larger than a given value (for example, 1) and to avoid providing the configuration in which the FH is enabled. In other words, the enabling of the FH may be limited, based on the DMRS-add-pos value. Alternatively, the DMRS-add-pos value may be limited, based on whether the FH is enabled/disabled.

For example, the UE may assume that the DMRS-add-pos is larger than a given value (for example, 1) and that the configuration in which the FH is enabled is not provided. In this case, the UE may assume that, in a case where the DMRS-add-pos that is a higher layer parameter is larger than the given value (for example, 1), the enabling of the FH is not configured (the disabling of the FH is configured). Alternatively, in the case where the enabling of the FH is configured, the UE may assume that the DMRS-add-pos is not configured to be larger than the given value (for example, 1).

In a case where a DMRS-add-pos larger than the given value (for example, 1) is configured by the higher layer signaling, the base station may perform control to prevent the enabling of the FH from being configured by using the DCI (for example, to configure the disabling of the FH). Alternatively, in a case where the FH is enabled for the PUSCH transmission, the base station may perform control to prevent a DMRS-add-pos larger than the given value (for example, 1) from being configured by the higher layer signaling.

Thus, by limiting the enabling of the FH based on the value of the DMRS-add-pos or limiting the value of the DMRS-add-pos based on the enabling or disabling of the FH, the DMRS mapping can be appropriately controlled, in a case of FH configuration, by utilizing the table in FIG. 2B or FIG. 3.

(Radio Communication System)

Hereinafter, a structure of a radio communication system according to one embodiment of the present invention will be described. In this radio communication system, the radio communication method according to each embodiment of the present invention described above may be used alone or may be used in combination for communication.

FIG. 5 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can apply CA or DC by using a plurality of cells (CCs) (for example, five or less CCs, six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel)), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on.

Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, SR (Scheduling Request), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 6:
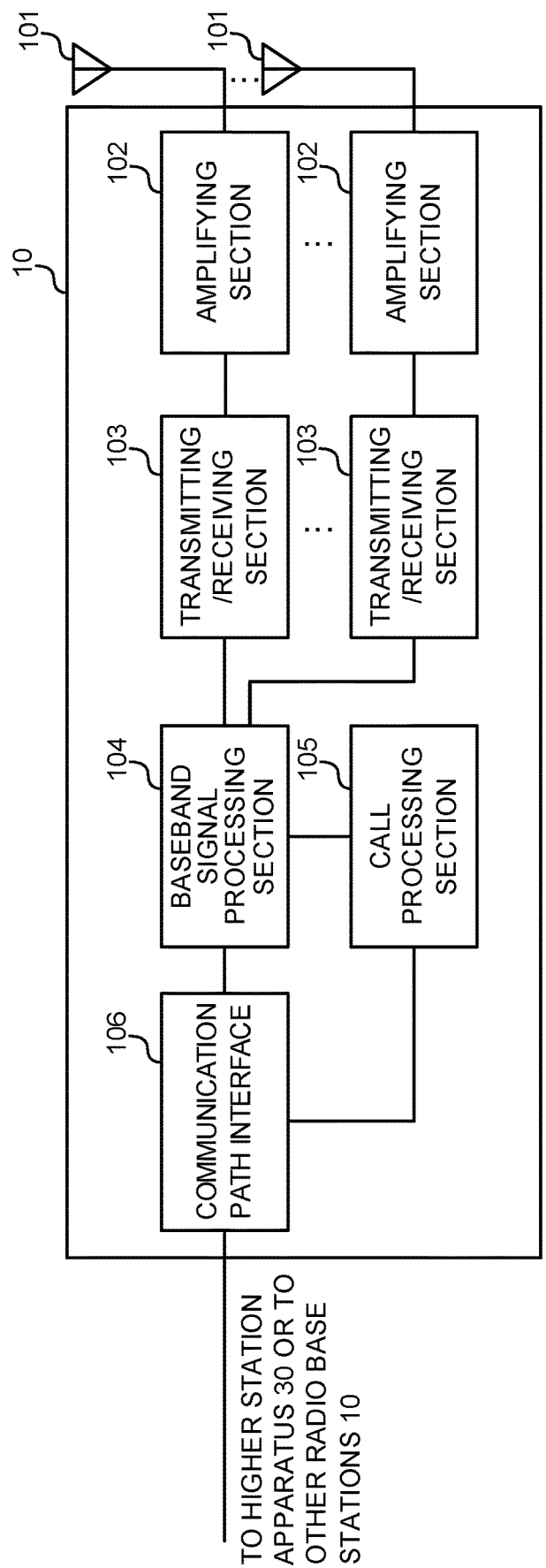
FIG. 6 is a diagram to show an example of an overall structure of a radio base station according to one present embodiment of the present invention.

FIG. 6 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the radio base station 10, manages the radio resources and so on.

The communication path interface 106 transmits and/or receives signals to and/or from the higher station apparatus 30 via a predetermined interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving section 103 receives uplink shared channels and demodulation reference signals (DMRSs) for the uplink shared channels. The transmitting/receiving section 103 may transmit information regarding whether the FH is enabled/disabled and information related to the DMRS configuration (for example, the DMRS-add-pos). The information regarding whether the FH is enabled/disabled may be transmitted in the DCI, and the information related to the DMRS configuration (for example, the DMRS-add-pos) may be transmitted by the higher layer signaling.

Figure 7:
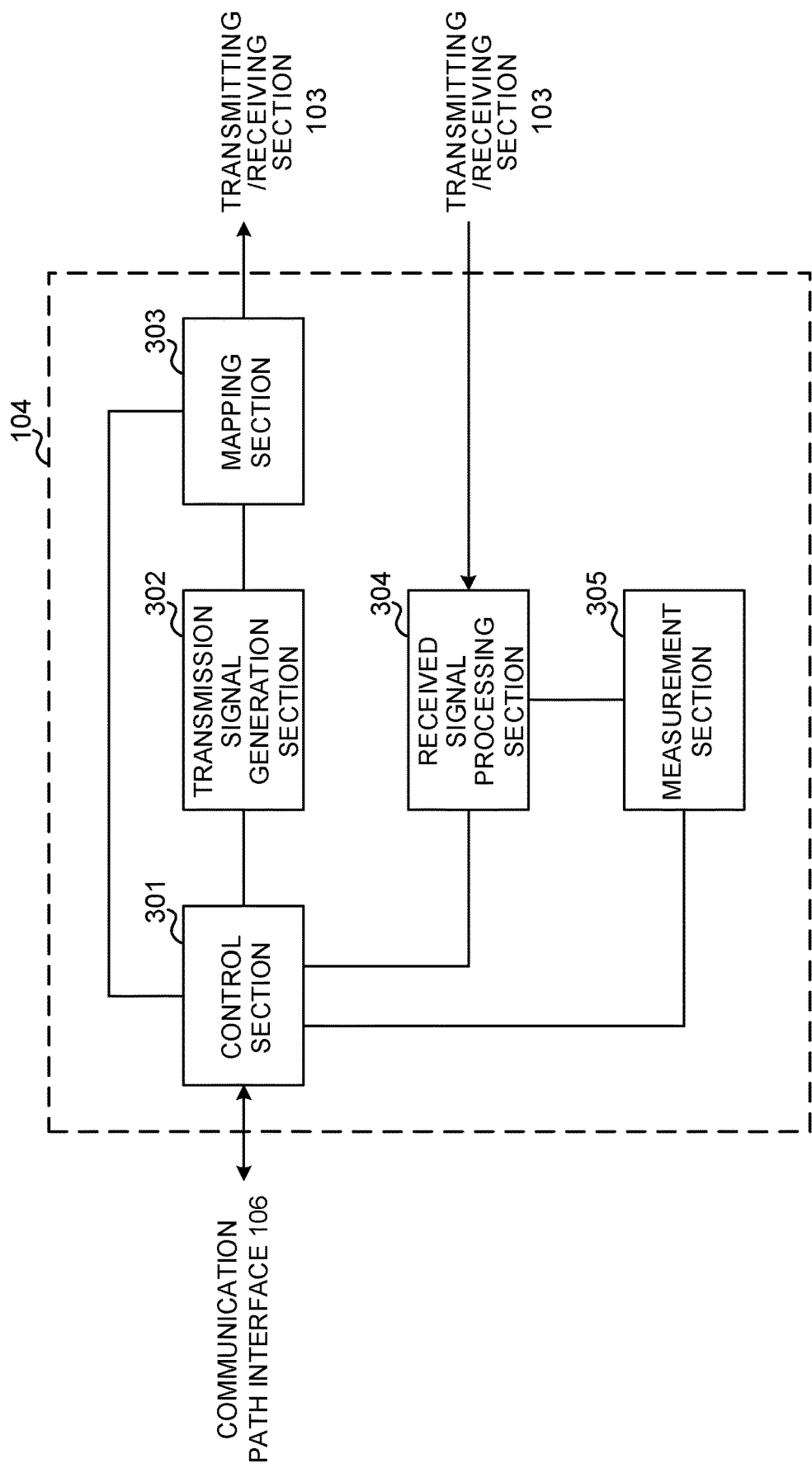
FIG. 7 is a diagram to show an example of a functional structure of the radio base station according to one embodiment of the present invention.

FIG. 7 is a diagram to show an example of a functional structure of the radio base station according to one embodiment of the present invention. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present invention pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on. The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH. Transmission confirmation information, and so on), a random access preamble (for example, a signal transmitted on the PRACH), an uplink reference signal, and so on.

In a case of configuring the frequency hopping of the PUSCH and sets, to a given value or larger, the configuration value (for example, the DMRS-add-pos) configured by the higher layer signaling, the control section 301 may control reception of DMRSs, based on common mapping positions. Alternatively, in a case of setting, to the given value or larger, the configuration value (for example, the DMRS-add-pos) configured by the higher layer signaling, the control section 301 may perform control to avoid configuring the frequency hopping of the PUSCH.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present invention pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to predetermined radio resources, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

(User Terminal)

Figure 8:
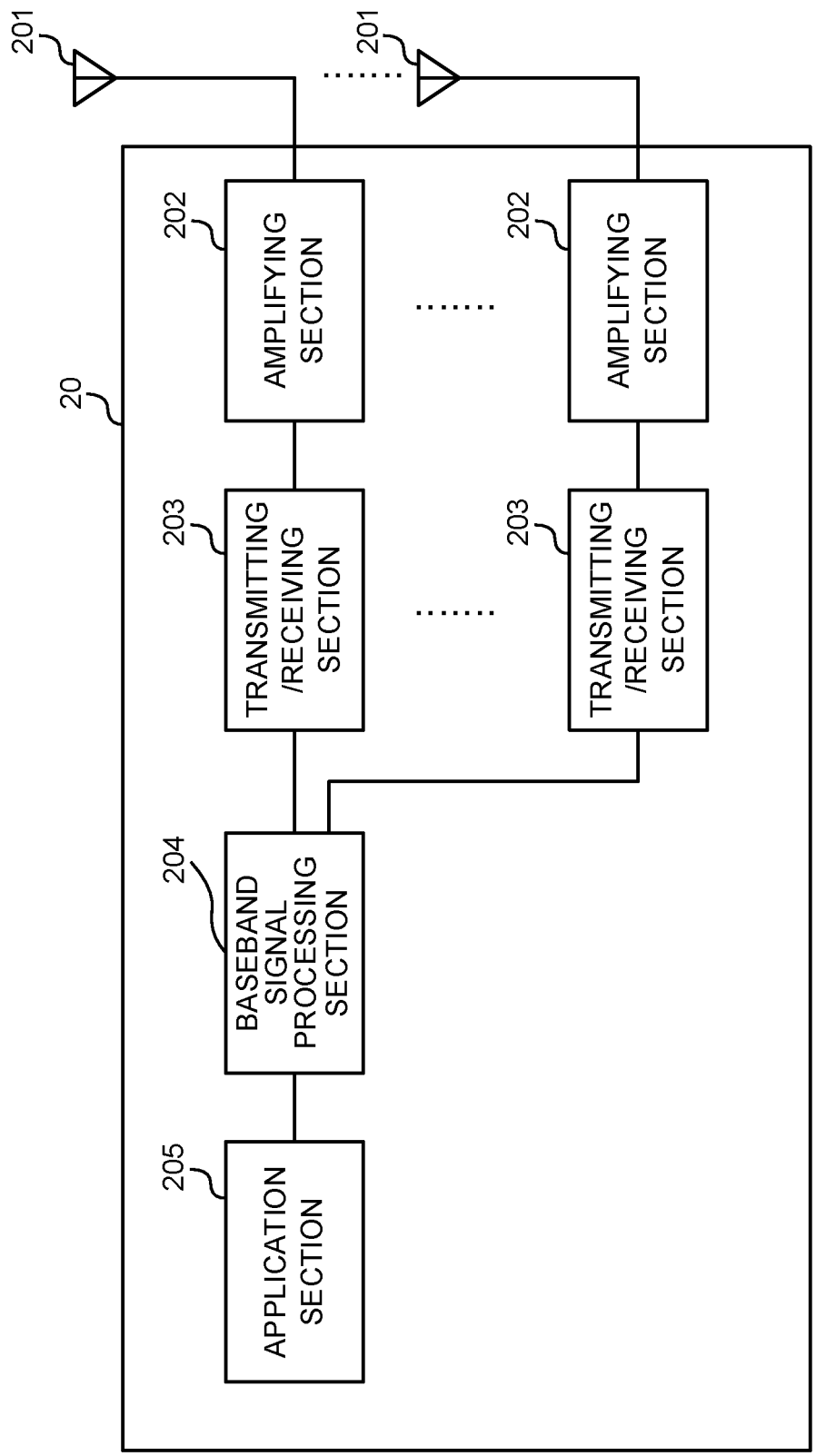
FIG. 8 is a diagram to show an example of an overall structure of a user terminal according to one embodiment of the present invention.

FIG. 8 is a diagram to show an example of an overall structure of a user terminal according to one embodiment of the present invention. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving section 203 transmits demodulation reference signals (DMRSs) for uplink shared channels, based on the configuration value configured by the higher layer signaling and on whether or not the frequency hopping of the uplink shared channels is configured. The transmitting/receiving section 203, the transmitting/receiving section 203 may receive information regarding whether the FH is enabled/disabled and information related to the DMRS configuration (for example, the DMRS-add-pos). The information regarding whether the FH is enabled/disabled may be received from the DCI, and the information related to the DMRS configuration (for example, the DMRS-add-pos) may be received by the higher layer signaling.

Figure 9:
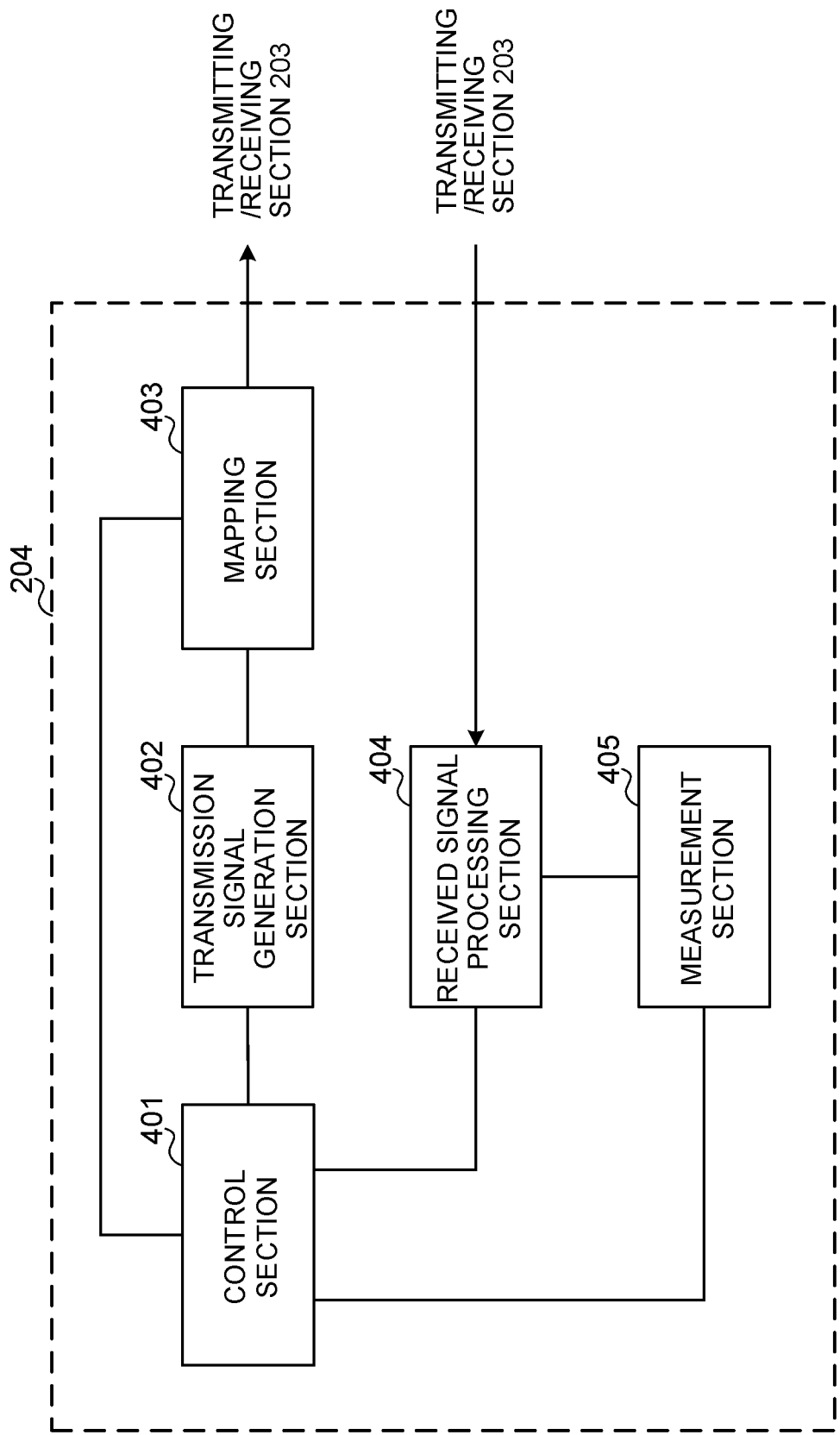
FIG. 9 is a diagram to show an example of a functional structure of the user terminal according to one embodiment of the present invention.

FIG. 9 is a diagram to show an example of a functional structure of the user terminal according to one embodiment of the present invention. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

In a case where the frequency hopping is configured and the configuration value is equal to or larger than a given value, the control section 401 may apply common mapping positions to control the transmission of the DMRSs. For example, in the case where the frequency hopping is configured and the configuration value is equal to or larger than the given value, the control section 401 may utilize the mapping positions of the DMRSs defined in association with a specific configuration value (for example, 1) (see FIG. 3).

Alternatively, in the case where the frequency hopping is configured and the configuration value is equal to or larger than the given value, the control section 401 may control the mapping of the DMRSs by utilizing a table in which common mapping positions of the DMRSs are defined for each configuration value equal to or larger than the given value (see FIG. 4). In the case where the frequency hopping is configured and the configuration value is larger than the given value, the control section 401 may determine the mapping positions of the DMRSs, based on the assumption that the configuration value is equal to the given value.

Alternatively, in a case where the configuration value is configured to be larger than the given value, the control section 401 may assume that the frequency hopping is not configured.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present invention pertains.

For example, the transmission signal generation section 402 generates an uplink control signal about transmission confirmation information, the channel state information (CSI), and so on, based on commands from the control section 401. The transmission signal generation section 402 generates uplink data signals based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present invention pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of at least one of hardware and/or software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus.

Figure 10:
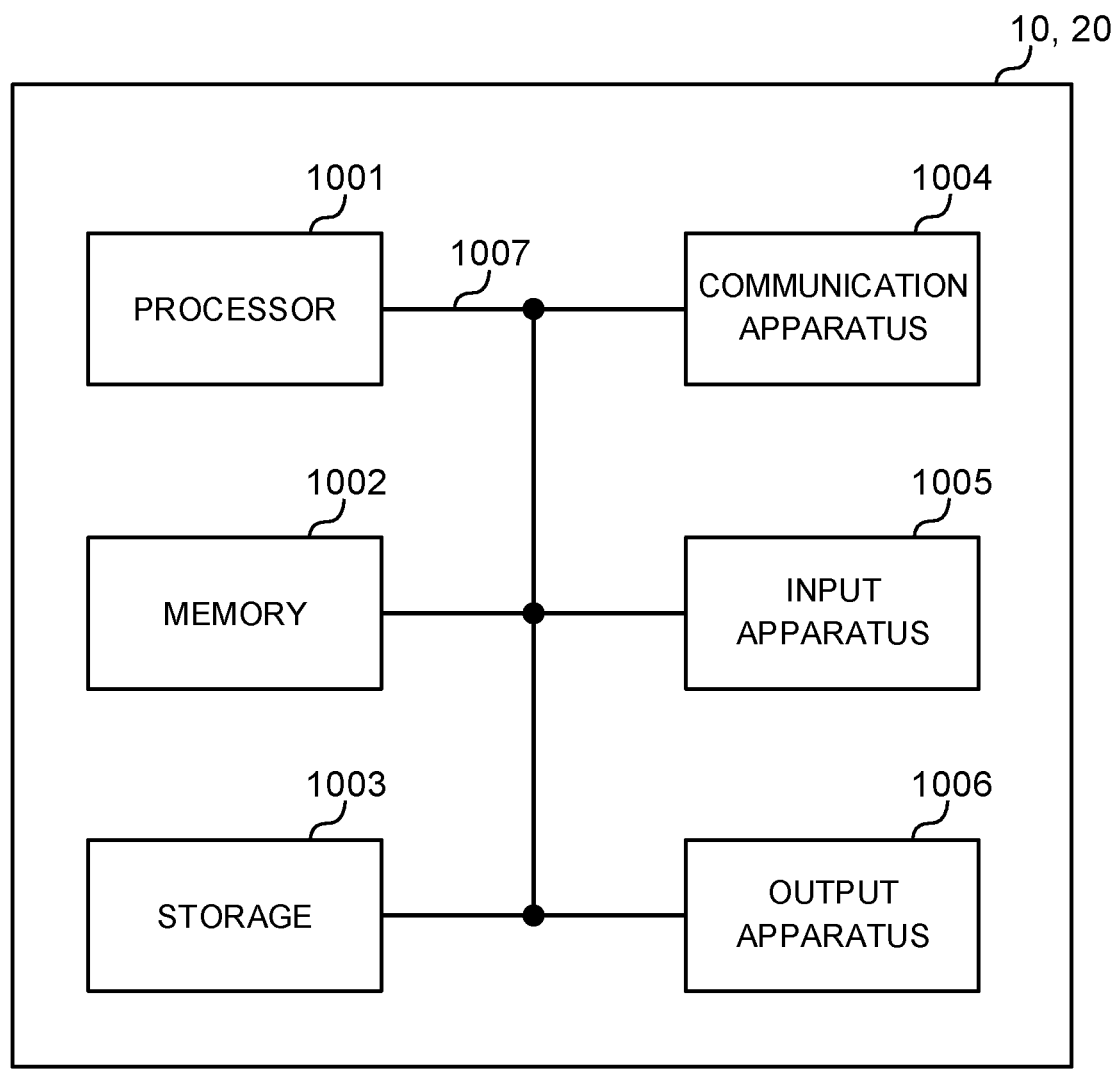
FIG. 10 is a diagram to show an example of a hardware structure of the radio base station and the user terminal according to one present embodiment of the present invention.

For example, a radio base station, a user terminal, and so on according to one embodiment of the present disclosure may function as a computer that executes the processes of the radio communication method of the present disclosure. FIG. 10 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing predetermined software (programs) to be read on hardware such as the processor 1001 and the memory 1002, and by allowing the processor 1001 to perform calculations to control communication via the communication apparatus 1004 and perform at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be replaced with "signals" ("signaling"). "Signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, "numerology" may refer to a communication parameter applied to at least one of transmission and reception of a certain signal or channel. For example, the numerology may indicate at least one of a subcarrier spacing (SCS), a bandwidth, a symbol length, a cyclic prefix length, a transmission time interval (TTI), the number of symbols per TTI, a radio frame configuration, a specific filtering process executed by a transceiver in the frequency domain, a specific windowing process executed by the transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. The PDSCH (or PUSCH) transmitted in time units each larger than a mini-slot may be referred to as a PDSCH (PUSCH) mapping type A. The PDSCH (or PUSCH) transmitted using mini-slots may be referred to as a PDSCH (PUSCH) mapping type B.

A radio frame, a subframe, a slot, a mini-slot, and a symbol all express time units in signal communication. A radio frame, a subframe, a slot, a mini-slot, and a symbol may each be called by other applicable terms.

For example, one subframe may be referred to as a "transmission time interval (TTI)," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain.

Also, an RB may include one or a plurality of symbols in the time domain, and may be one slot, one mini-slot, one subframe, or one TTI in length. One TTI and one subframe each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair," and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of predetermined information (for example, reporting of "X holds") does not necessarily have to be reported explicitly, and can be reported implicitly (by, for example, not reporting this predetermined information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably.

The following terms may be used herein interchangeably: the "base station (BS)", the "radio base station", the "fixed station", the "NodeB", the "eNodeB (eNB)", a "gNodeB (gNB)", an "access point", a "transmission point", a "reception point", a "transmission/reception point", the "cell", a "sector", a "cell group", the "carrier", a "component carrier", a "bandwidth part (BWP)", and so on. The base station may be referred to as the terms such as a "macro cell," a "small cell," a "femto cell," a "pico cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," "terminal" and the like may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be also referred to as "transmission apparatus," "reception apparatus," or the like. Note that at least one of a base station and a mobile station may be a device mounted in a moving body, the moving body itself, or the like. The moving body may be a vehicle (for example, a car or an airplane), an unmanned moving body (for example, a drone or an autonomous car), or a robot (manned or unmanned). Note that at least one of a base station and a mobile station includes apparatus that does not necessarily move during communication operation.

The radio base stations in the present disclosure may be interpreted as user terminals. For example, each aspect/embodiment of the present disclosure may be applied to a configuration in which communication between a radio base station and a user terminal is replaced with communication among a plurality of user terminals (that may also be referred to as, for example, D2D (Device-to-Device) or V2X (Vehicle-to-Everything)). In this case, the user terminals 20 may have the functions of the radio base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminals in the present disclosure may be interpreted as radio base stations. In this case, the radio base stations 10 may have the functions of the user terminals 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as used in the present disclosure may encompass a wide variety of actions. For example, "judging (determining)" may be interpreted to mean making calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables, printed electrical connections and so on, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." The terms "separate," "be coupled" and so on may be interpreted similarly.

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The present application is based on Japanese Patent Application No. 2018-090965 filed on Apr. 18, 2018. The entire contents thereof are incorporated herein.

What is claimed is:

1. A terminal comprising:
a processor that determines a position of a demodulation reference signal for an uplink shared channel based on whether or not intra-slot frequency hopping of the uplink shared channel is enabled and based on a configuration value set by higher layer signaling; and
a transmitter that transmits the uplink shared channel and the demodulation reference signal,
wherein if the configuration value is set to greater than 1 and the intra-slot frequency hopping is enabled, then the processor determines the position of the demodulation reference signal assuming that the configuration value is equal to a given value.

2. The terminal according to claim 1, wherein the given value is 1.

3. The terminal according to claim 1, wherein if the configuration value is set to greater than 1 and the intra-slot frequency hopping is enabled, the processor determines the position of the demodulation reference signal assuming that the configuration value is 1.

4. The terminal according to claim 1, wherein the processor determines whether or not the intra-slot frequency hopping is enabled based on downlink control information.

5. The terminal according to claim 1, wherein the processor determines the position of the demodulation reference signal based on a duration of the uplink shared channel, a mapping type, and the configuration value.

6. A radio communication method for a terminal, the radio communication method comprising:
determining a position of a demodulation reference signal for an uplink shared channel based on whether or not intra-slot frequency hopping of the uplink shared channel is enabled and based on a configuration value set by higher layer signaling; and
transmitting the uplink shared channel and the demodulation reference signal,
wherein if the configuration value is set to greater than 1 and the intra-slot frequency hopping is enabled, then the terminal determines the position of the demodulation reference signal assuming that the configuration value is equal to a given value.

7. A base station comprising:
a processor that determines a position of a demodulation reference signal for an uplink shared channel based on whether or not intra-slot frequency hopping of the uplink shared channel is enabled and based on a configuration value set by higher layer signaling; and
a receiving section that receives the uplink shared channel and the demodulation reference signal,
wherein if the configuration value is set to greater than 1 and the intra-slot frequency hopping is enabled, then the position of the demodulation reference signal is determined assuming that the configuration value is equal to a given value.

8. The terminal according to claim 2, wherein the processor determines whether or not the intra-slot frequency hopping is enabled based on downlink control information.

9. The terminal according to claim 3, wherein the processor determines whether or not the intra-slot frequency hopping is enabled based on a downlink control information.

10. The terminal according to claim 2, wherein the processor determines the position of the symbols based on a duration of the uplink shared channel, a mapping type, and the configuration value.

11. The terminal according to claim 3, wherein the processor determines the position of the symbols based on a duration of the uplink shared channel, a mapping type, and the configuration value.

12. The terminal according to claim 4, wherein the processor determines the position of the symbols based on a duration of the uplink shared channel, a mapping type, and the configuration value.

13. A system comprising a terminal and a base station, wherein:
  the terminal comprises:
    a processor that determines a position of a demodulation reference signal for an uplink shared channel based on whether or not intra-slot frequency hopping of the uplink shared channel is enabled and based on a configuration value set by higher layer signaling; and
    a transmitter that transmits the uplink shared channel and the demodulation reference signal; and
  the base station comprises:
    a receiver that receives the uplink shared channel and the demodulation reference signal,
  wherein if the configuration value is set to greater than 1 and the intra-slot frequency hopping is enabled, then the processor determines the position of the demodulation reference signal assuming that the configuration value is equal to a given value.

\* \* \* \* \*